United States Patent

Smith et al.

[15] 3,668,191
[45] June 6, 1972

[54] ADDUCTS OF N-SUBSTITUTED AZIRIDINES AND ORGANIC ACID ANHYDRIDES

[72] Inventors: Harry A. Smith, Midland; Bobbie E. Rooker, Hope, both of Mich.

[73] Assignee: The Dow Chemical Company, Midland, Mich.

[22] Filed: Dec. 9, 1970

[21] Appl. No.: 96,604

[52] U.S. Cl. ...............260/78.4 R, 117/71 R, 117/122 PA, 156/331, 161/196, 161/219, 260/239.3 R
[51] Int. Cl. ...................................C08f 25/00, C08g 33/08
[58] Field of Search....................260/78.4 R, 2 EN

[56] References Cited

UNITED STATES PATENTS

| | | | |
|---|---|---|---|
| 3,166,590 | 1/1965 | Tsou | 260/570.5 |
| 3,350,340 | 10/1967 | Soenksen et al. | 260/29.6 |
| 3,225,013 | 12/1965 | Fram | 260/78 |
| 3,452,002 | 6/1969 | Brasch | 260/239.3 |

*Primary Examiner*—Joseph L. Schofer
*Assistant Examiner*—John Kight, III
*Attorney*—Griswold & Burdick, L. Wayne White and C. E. Rehberg

[57] ABSTRACT

Novel resins are prepared by reacting (a) maleic or succinic anhydride with (b) an aziridine of the formula

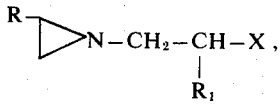

wherein R and $R_1$ are hydrogen or lower alkyl; and X is hydroxy, amino or cyano. The resins are useful contact adhesives.

10 Claims, No Drawings

ADDUCTS OF N-SUBSTITUTED AZIRIDINES AND ORGANIC ACID ANHYDRIDES

BACKGROUND OF THE INVENTION

Copolymers of certain organic acid anhydrides, e.g., phthalic anhydride, and certain N-hydrocarbon substituted aziridines are described in (1) "Ethylenimine and Other Aziridines" by O. C. Dermer and G. E. Ham, Academic Press, N. Y. (1969), p. 324, and (2) British Pat. No. 784,059. U.S. Pat. No. 3,452,002 describes the reaction of anhydrides with various non-N-substituted alkylenimines.

SUMMARY OF THE INVENTION

Novel resins have now been discovered which are useful contact adhesives. The resins are prepared by reacting (a) maleic anhydride or succinic anhydride with (b) an aziridine of the formula

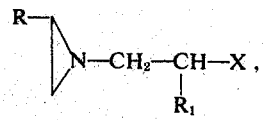

wherein R and $R_1$ are hydrogen or lower alkyl (such as methyl, ethyl, butyl, etc.) and are preferably each hydrogen; and X is hydroxy, amino or cyano (preferably hydroxy).

The resins, as initially formed upon mixing (a) and (b) above, are water-soluble adhesives. Such resins may be converted to water-insoluble adhesives by heating to a temperature of from about 65° to about 250° C. (preferably 175° to 225° C.).

The resins are typically prepared by mixing (a) and (b) above at room temperature either neat or in an inert solvent, such as methylene chloride, chloroform, carbon tetrachloride, methyl chloroform, etc. Preferably, they are prepared in situ by applying (a), or a solution of (a), to the surface of a first substrate and (b), or a solution of (b), to the surface of a second substrate and thereafter mating (joining) the thus coated surfaces by contact. The bond formed between the coated substrates is essentially instantaneous and is improved by heating the laminate thus formed to a temperature of from about 65° C. to about 250° C. (preferably 175° C. to 225° C.).

The molar proportion of (a) to (b) in forming the product is not critical but most efficient use of the reactants is achieved by using a substantially equimolar proportion of reactants (e.g., from about 0.8 to about 1.2 moles of (a) per mole of (b)) with a slight excess of anhydride, (a), being preferred.

The solid substrates which may be bonded together with the subject resins include metallic substrates, such as aluminum, aluminum alloys, iron, steels, chromium, nickel, etc.; glass substrates; cellulosic substrates, such as wood, paper, cardboard, etc.; and building materials, such as bricks, concrete blocks, sand, gravel, etc.; and mixtures of such substrates. Metallic substrates are preferred (particularly aluminum substrates).

SPECIFIC EMBODIMENTS:

The following examples further illustrate the invention:
General Procedure

A solution of the aziridinyl reactant (0.5 mole) in 200 ml. of methylene chloride was added dropwise to a stirred solution of anhydride (0.5 mole) in 200 ml. of methylene chloride. The exothermic reaction was maintained at or below the boiling point of the mixture for a total of from 2 to 16 hours with stirring. The solvent and other volatile components were removed from the reaction mixture under reduced pressure leaving the solid resinous product in greater than 95 percent yield, by weight, based on starting materials. The results of several experiments are tabulated in Table I.

TABLE I

| Example | Aziridine | Anhydride | Product Description |
|---|---|---|---|
| 1. | N-(2-cyanoethyl) | MA* | dark solid; m.p. 50°–60°C. |
| 2. | N-(2-cyanoethyl) (0.4 mole) | MA | black solid; m.p. 140°-150°C. |
| 3. | N-(2-hydroxyethyl) | MA | white solid; m.p. 120°-130°C. |
| 4. | N-(2-aminoethyl) | MA | white solid; m.p. 125°–140°C. |
| 5. | N-(2-cyanoethyl) | SA** | white solid; m.p. 60°–70°C. |
| 6. | N-(2-hydroxyethyl) | SA | white solid; m.p. 90°–100°C. |
| 7. | N-(2-aminoethyl) | SA | white solid; m.p. 130°–150°C. |

*MA is maleic anhydride.
**SA is succinic anhydride.

Examples 5, 6 and 7 were duplicated except no solvent was used. The resins obtained were quite similar to those in Table I. In a similar series of runs which excluded solvent, the addition of MA to the various aziridines in Examples 1–4 resulted in an insoluble reaction product.

The resins of Table I were applied to pieces of aluminum foil (or coupons) whose surface had been treated in accordance with ASTM D 2651-67. Laminate-structured samples were prepared by mating two pieces of coated foil or by mating two pieces of coated coupons. The samples were cured for 15 minutes under a pressure of 200 p.s.i. at the temperature indicated in Table II. Their "Peel Adhesion" was determined pursuant to ASTM D 1876–69 and "Lap Shear" adhesion pursuant to ASTM D 1002-64. The results of such adhesion tests are summarized in Table II.

TABLE II

| Product from Example | Cure Temperature (°C.) | Lap Shear (p.s.i.) | T-Peel (lbs./in.) |
|---|---|---|---|
| 1 | 225 | 1100 | 1.3 |
| 2 | 200 | 600 | 1.4 |
| 3 | 75 | 300 | 5.3 |
| 3 | 200 | 1000 | 1.6 |
| 4 | 200 | 1100 | 3.9 |
| 5 | 225 | 600 | 2.4 |
| 6 | 175 | 250 | 1.7 |
| 6 | 65 | 200 | 3.2 |
| 7 | 200 | 400 | 1.8 |
| Control* | 100 | 850 | 1.4 |

*Control - a conventional bisphenol A-based epoxy resin cured with an aliphatic amine.

We claim:

1. An adhesive composition prepared by reacting (a) maleic anhydride or succinic anhydride with (b) an aziridine of the formula

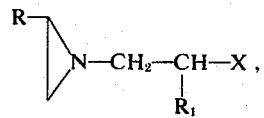

wherein R and $R_1$ are hydrogen or lower alkyl; and X is hydroxy, amino or cyano.

2. The composition defined in claim 1 wherein R and $R_1$ are each hydrogen.

3. The composition defined in claim 1 wherein X is hydroxy.

4. The composition defined in claim 1 wherein said composition is prepared in the presence of an inert solvent having a boiling point of below about 100° C.

5. The composition defined in claim 4 wherein said solvent is methylene chloride.

6. A water-insoluble, cross-linked composition prepared by thermally curing the composition defined in claim 1.

7. In the process of adhering a first solid substrate to a second solid substrate by means of an adhesive, the improvement consisting of using the composition defined in claim 1 as the adhesive.

8. The process defined in claim 7 wherein said first and second substrates are metallic or glass.

9. The process defined in claim 8 wherein said first and second substrates are aluminum or an aluminum alloy.

10. The process defined in claim 7 wherein the laminate formed by said first and second substrates and the adhesive is subjected to a temperature sufficient to cure the adhesive.

* * * * *